United States Patent [19]

Toyama

[11] Patent Number: 5,155,601
[45] Date of Patent: Oct. 13, 1992

[54] DATA COMMUNICATION APPARATUS

[75] Inventor: Takeski Toyama, Hiratsuka, Japan

[73] Assignee: Canon Kabushiki Kaisha, Tokyo, Japan

[21] Appl. No.: 851,127

[22] Filed: Mar. 16, 1992

Related U.S. Application Data

[63] Continuation of Ser. No. 582,787, Sep. 17, 1990, which is a continuation of Ser. No. 114,519, Oct. 30, 1987.

[30] Foreign Application Priority Data

Nov. 6, 1986 [JP] Japan .................. 61-265003

[51] Int. Cl.⁵ ............................. H04N 1/00
[52] U.S. Cl. .................... 358/401; 358/405; 358/407; 358/440
[58] Field of Search ........... 358/400, 401, 405, 407, 358/434, 435, 436, 444, 437, 438, 439, 440; 379/100

[56] References Cited

U.S. PATENT DOCUMENTS

| | | | |
|---|---|---|---|
| 3,962,534 | 6/1976 | Ogawa | 358/257 |
| 4,153,916 | 5/1979 | Miwa | 358/257 |
| 4,524,393 | 6/1985 | Ohzeki | 358/257 |
| 4,573,083 | 2/1986 | Shimizu | 358/434 |
| 4,706,126 | 11/1987 | Kondo | 358/257 |
| 4,719,514 | 1/1988 | Kurahayashi et al. | 358/261 |
| 4,727,429 | 2/1988 | Ueno | 358/256 |
| 4,733,303 | 3/1988 | Koshiishi | 358/257 |
| 4,736,249 | 4/1988 | Iizuka et al. | 358/435 |
| 4,774,590 | 9/1988 | Haganuma et al. | 358/444 |
| 4,800,439 | 1/1989 | Yoshino | 358/257 |
| 4,829,385 | 5/1989 | Takezawa | 358/433 |
| 4,855,839 | 8/1989 | Saito | 358/434 |

FOREIGN PATENT DOCUMENTS 0054774 3/1983 Japan .

Primary Examiner—Edward L. Coles, Sr.
Assistant Examiner—Jerome Grant, II
Attorney, Agent, or Firm—Fitzpatrick, Cella, Harper & Scinto

[57] ABSTRACT

In a data communication apparatus having data receiver, a memory for storing received data and output means for outputting the data of the memory after the data has been received, means is provided for informing receipt of data to a sending station of the data when the data is output by the output means.

9 Claims, 3 Drawing Sheets

FIG.3

RECEIPT OF
CONFIDENTIAL
FACSIMILE
HAS BEEN
ACKNOWLEDGED

'86.2.27 15:00

FROM ○○○○

DATA COMMUNICATION APPARATUS

This application is a continuation of application Ser. No. 07/582,787 filed Sep. 17, 1990, which is a continuation of application Ser. No. 07/114,519 filed Oct. 30, 1987.

BACKGROUND OF THE INVENTION

1. Field of the Invention

The present invention relates to a data communication apparatus for communicating data such as image data and character code data.

2. Related Background Art

In a conventional apparatus of this type such as a facsimile machine for communicating image data, received data is temporarily stored in a memory, and after the communication, the received data in the memory is printed out by an operator action.

In such an apparatus, an operator at the sending station cannot know whether an operator at a receiving station has received the data or not, and if the operator at the sending station wants to know whether the operator at the receiving station has received the data, the former operator has to confirm it by telephone conversation. In a personal communication in which data is to be sent to only a particular receiver, the confirmation of data receipt is frequently required.

In the U.S. patent application Ser. Nos. 913,997, 914,652 and 070,777 assigned to the assignee of the present invention, the received data is stored in the memory and the data in the memory is recorded after the completion of the reception.

In the U.S. patent application Ser. No. 834,780 assigned to the assignee of the present invention, the received data is recorded while it is stored in the memory, and when the record is completed, a message acknowledge (confirmation) signal (MCF) of the facsimile communication protocol is sent to a sending station. In the U.S. patent application Ser. No. 834,780, the line is occupied until the record is completed and a long communication time is required.

SUMMARY OF THE INVENTION

It is an object of the present invention to improve a data communication apparatus.

It is another object of the present invention to eliminate the problems described above.

It is a further object of the present invention to automatically inform the receipt of data by a data receiver to a data sender.

It is another object of the present invention to automatically inform the receipt of data to a data sender when an operator at a receiving station read out the received data stored in a memory.

It is a still further object of the present invention to automatically inform the receipt of data to a data sender when a sendee receives the data sent by personal communication with the sendee being designated.

It is a further object of the present invention to automatically inform the data output to a sender when the data having an uncertain data output time is output at a receiving station.

It is a yet still further object of the present invention to automatically inform the data output to a sender when the data is output at a receiving station after the data communication.

Other objects of the present invention will be apparent from the following description of the preferred embodiment.

BRIEF DESCRIPTION OF THE DRAWINGS

FIG. 3 shows a message representing receipt of personal image in the embodiment.

DETAILED DESCRIPTION OF THE PREFERRED EMBODIMENTS

One embodiment of the present invention will be explained in detail with reference to the drawings.

Figure 1:
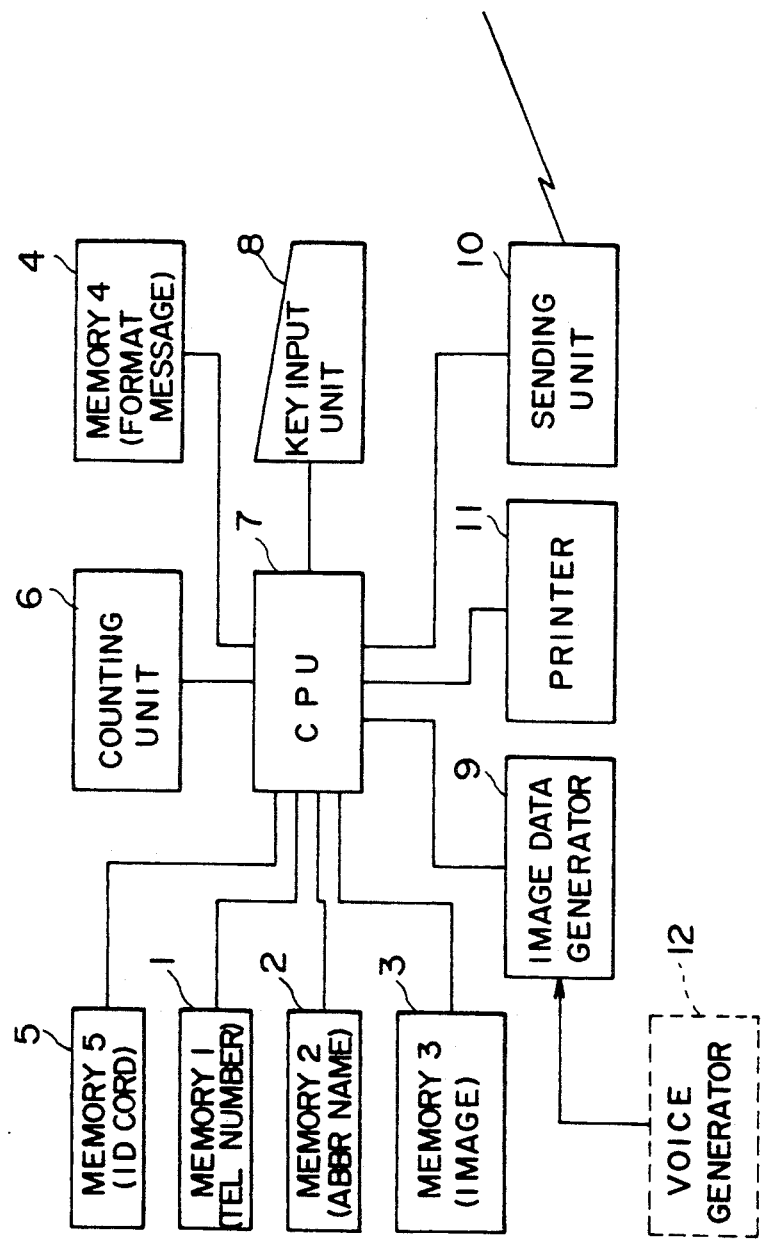
FIG. 1 shows a block diagram of one embodiment.

FIG. 1 shows a block diagram of one embodiment. Numerals 1, 2, 4 and 5 denote memories for storing telephone number, user abbreviation, formal message and personal communication secret number, respectively, numeral 3 denotes a memory for storing personal communication received image, numeral 6 denotes a clock, numeral 7 denotes a CPU comprising a microcomputer for controlling an overall system and peripheral equipments such as ROM and RAM, numeral 8 denotes a key input device, numeral 9 denotes a converter for converting code data to image data, numeral 10 denotes a transmitter for communicating data, and numeral 11 denotes a printer for recording data.

Figure 2:
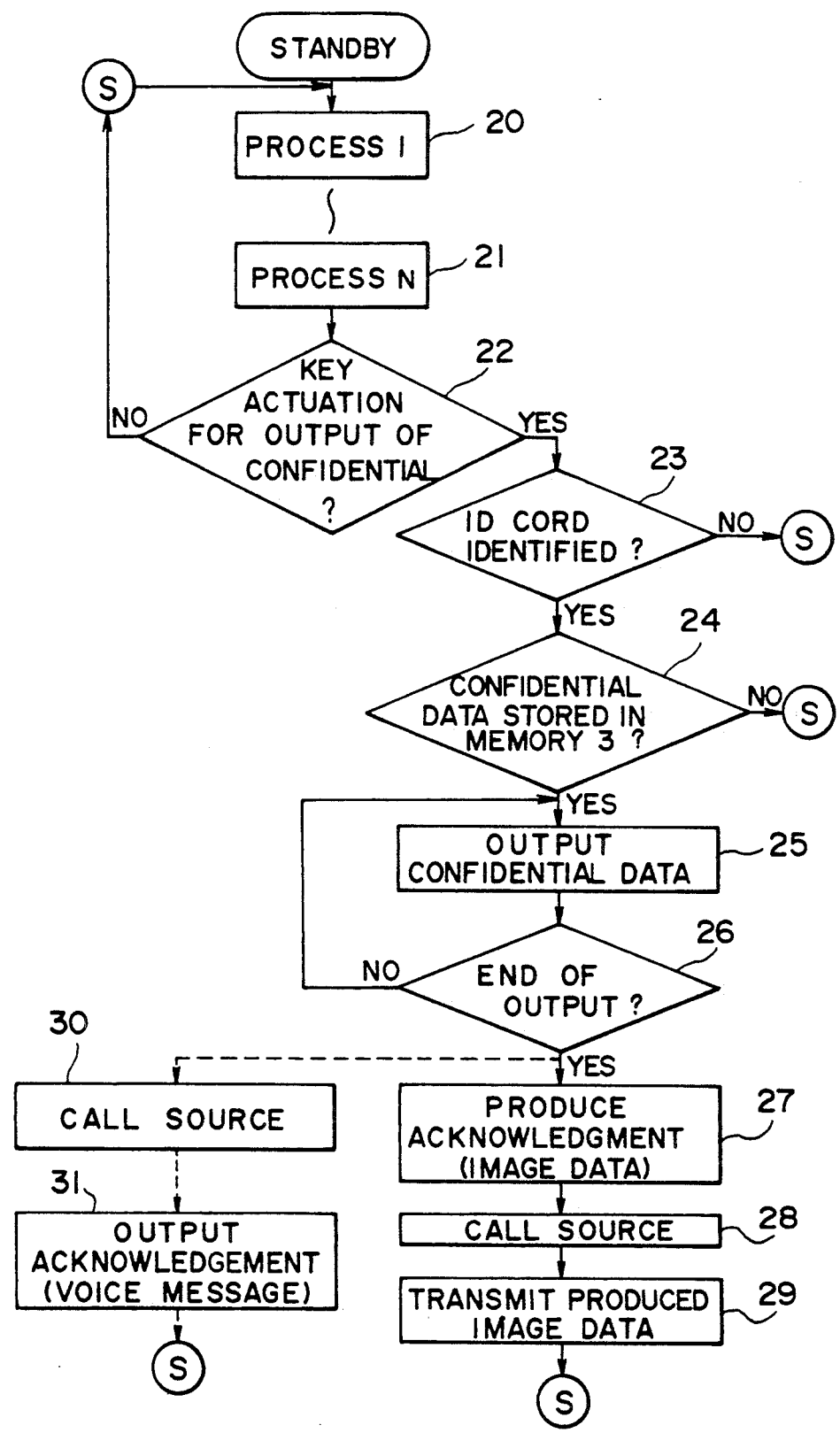
FIG. 2 shows a flow chart of a control operation of a CPU 7 of the embodiment.

FIG. 2 shows a flow chart of a control operation of the CPU 7 in the embodiment. A program for executing the operation of the flow chart is stored in the ROM (not shown) of the CPU 7.

The flow chart of FIG. 2 is now explained. In a normal stand-by state, the CPU 7 carries out a stand-by process including a process 1 at a step 20 to a process N at a step 21 and waits for keying by an operator. The processes 1 to N are those for monitoring a call from a line, transmission, reception, key input and displaying. In the transmission and reception, image data is transmitted and received. The reception of the image data is explained below. When a call signal from the line is detected by the call monitor process, the transmitter 10 occupies the line. Then, the transmitter receives the image data in accordance with the facsimile communication protocol of the CCITT Recommendation, and sequentially stores the received image data into the memory 3 (or sequentially record it by the printer 11). In the facsimile communication protocol of the CCITT Recommendation in the receive process, a called equipment (station) identification (CED) indicating that the receiving equipment is a non-voice terminal is sent through the transmitter 10, and then sends non-standard function (facilities) (NSF), called terminal (subscriber) identification (CSI) and digital identification signal (DIS) indicating a standard capability of the receiving equipment. Then, non-standard function (facilities) setting (NSS), transmitting station (subscriber) identification (TSI) and digital command signal (DCS) from the transmitting station are received, and then training signal and training check (TCF) are received. When the TCF is received, the training check is performed, and if the result is good, ready to receive (confirmation to receive signal) (CFR) is sent and the image data is received. After the image data has been received, a post procedure is carried out to release the line.

In the present embodiment, information indicating that the receiving equipment has a personal communication function is sent with the NSF. The transmitting equipment sets information indicating the selection of the personal communication mode and ID code (secret number) in the NSS and sets telephone number information in the TSI. The receiving equipment stores the ID code set in the NSS into the memory 5 and stores the telephone number information of the TSI into the memory 1.

During the execution of the processes 1 to N, if the operator keys the key input device 8 to output the personal image data stored in the memory 3 (including the entry of the secret number) (step 22), whether the keyed-in number matches with the secret number stored in the memory 5 and whether the memory 3 contains the personal communication received image information are checked in steps 23 and 24, and if both conditions are met, the image data in the memory 3 is printed out by the printer 11 in a step 25.

When the end of printout is detected in a step 26, the abbreviation of the personal communication image addressee and the formal message are read from the memory 4, and the date and time data are read from the clock 6. In a step 27, image data shown in FIG. 3 is generated by the image data generator 9.

When the personal communication image was sent, the telephone number of the sending station in the facsimile protocol signal TSI was stored into the memory 1. Thus, the telephone number is read from the memory 1, and the CPU 7 calls the sending station through the transmitter 10 in a step 28.

When the line is connected to the sending station, the CPU 7 sends the image data generated in the step 27 through the transmitter 10 in a step 29 as acknowledgement of receipt of the personal communication image.

In this manner, the sender of the personal communication image can automatically confirm the receipt of the image by the sendee.

In the present embodiment, the acknowledge message is sent in a form of image data. Alternatively, information indicating the acknowledgement may be set in the facsimile communication protocol signal NSS to inform the receipt to the sending station. In this case, the communication time required for informing the receipt is shortened compared to a case where the acknowledgement is sent in the form of image data.

In the present embodiment, the acknowledgement is informed in the form of image data. Alternatively, a call may be made to a telephone set of a sender to inform the receipt by voice message. In this case, a voice message generator 12 is provided in place of the image data generator 9 of FIG. 1. Instead of the steps 27-29 of FIG. 2, the telephone number in the memory 1 is called in a step 30. The sending station sends the telephone number information together with the NSS, and the receiving station stores the telephone number in the NSS into the memory 1.

In a step 31, the voice message generator 12 generates a voice message such as "This is ○○○. I received the personal communication image." and sends it to the sending station through the transmitter 10. In this manner, the operator of the sending station is informed of the acknowledgement.

In the present embodiment, a facsimile machine for image data communication has been explained. In other data communication such as telex and personal computer communication, the personal communication message is stored in the memory. The present invention is applicable to any data communication apparatus in which the personal data in the memory is read after the completion of the communication.

In the telex and personal computer communication, a return message indicating the data output is prepared in a form of code data.

As described above, when the personal communication received data stored in the memory is read by the sendee, the data is automatically sent to the sender to acknowledge the receipt. Accordingly, the sender can confirm the reception of the data by the sendee without making a telephone conversation.

The present invention is not limited to the illustrated embodiment but many variations thereof may be made.

I claim:

1. An image data communication apparatus comprising:

receiving means for receiving image data and number data indicating a sending station sent from the sending station through a communication line;

first memory means for storing the image data received by said receiving means;

second memory means for storing the number data indicating the sending station received by said receiving means;

means for releasing a channel occupied to communicate with said sending station after said receiving means has received the image data;

recording means for reading the image data stored in said first memory means, said recording means arranged to start reading the image data stored in said first memory means after said releasing means releases the channel, and for recording the image data read thereby;

discriminating means for discriminating whether or not said recording means has recorded all the image data sent from the sending station;

connecting means for dialing in accordance with the number data stored in said second memory means to again connect a channel to communicate with the sending station when said discriminating means determines an end of the recording; and sending means for sending a message indicating the reception of the image data to the sending station through the channel connected by said connecting means.

2. An image data communication apparatus according to claim 1, further including setting means for setting a first mode, for storing the image data received by said receiving means into said first memory means, and a second mode, for sequentially sending the received image data from said receiving means to said recording means for recording without storing the received image data in said first memory means.

3. An image data communication apparatus according to claim 1, wherein said transmission means transmits an image data indicating the reception of the image data.

4. An image data communication apparatus according to claim 1, wherein said transmission means transmits a voice message indicating the reception of the image data.

5. An image data communication apparatus according to claim 1, further comprising input means for providing a command signal for recording the image data of said first memory means, wherein the image data of said first memory means is recorded by said recording means in accordance with the command signal from said input means.

6. An image data communication apparatus according to claim 5, wherein a specific code is assigned to the image data in said first memory means, and said recording means records the image data when said specific code is input by said input means.

7. An data communication apparatus, comprising:

receiving means for receiving image data and number data indicating a sending station from the sending station through a communication line;

memory means for storing the image data and the number data received by said receiving means;

means for releasing a channel occupied to communicate with the sending station after said receiving means has received the image data;

command means for providing a command signal for recording the image data stored in said memory means;

recording means for recording the image data stored in said memory means, in accordance with the command signal from said command means output after said releasing means releases an channel;

discriminating means for discriminating whether or not the recording of the image data by said recording means has been completed;

connecting means for dialing on the basis of the number data stored in said memory means to again connect a channel to communicate with the sending station when said discriminating means determines the end of the recording; and sending means for sending a message indicating the reception of the image data through the channel connected by said connecting means.

8. A data communication apparatus according to claim 7, wherein a specific code is assigned to the image data of said memory means, and said recording means records data corresponding to the specific code when said command means inputs the specific code.

9. A data communication apparatus according to claim 7 wherein said transmitting means transmits a voice message.

* * * * *

UNITED STATES PATENT AND TRADEMARK OFFICE
CERTIFICATE OF CORRECTION

PATENT NO. : 5,155,601
DATED : October 13, 1992
INVENTOR(S) : Takeski Toyama

It is certified that error appears in the above-identified patent and that said Letters Patent is hereby corrected as shown below:

Title page,
<u>AT [75] INVENTOR</u>

"Takeski Toyama," should read --Takeshi Toyama,--.

<u>COLUMN 5</u>

Line 6, "An" should read --A--.

Signed and Sealed this

Fourteenth Day of December, 1999

Attest:

Q. TODD DICKINSON

*Attesting Officer*  *Acting Commissioner of Patents and Trademarks*